(12) United States Patent
Engel et al.

(10) Patent No.: US 9,378,892 B2
(45) Date of Patent: Jun. 28, 2016

(54) CERAMIC MULTILAYER CAPACITOR

(75) Inventors: Guenter Engel, Leibnitz (AT); Christian Hoffmann, Artemisu Kozu (JP); Andrea Testino, Genoa (IT)

(73) Assignee: EPCOS AG, Munich (DE)

( * ) Notice: Subject to any disclaimer, the term of this patent is extended or adjusted under 35 U.S.C. 154(b) by 1008 days.

(21) Appl. No.: 13/575,256

(22) PCT Filed: Jan. 25, 2011

(86) PCT No.: PCT/EP2011/050989
§ 371 (c)(1),
(2), (4) Date: Oct. 19, 2012

(87) PCT Pub. No.: WO2011/089269
PCT Pub. Date: Jul. 28, 2011

(65) Prior Publication Data
US 2013/0026852 A1    Jan. 31, 2013

(30) Foreign Application Priority Data

Jan. 25, 2010  (DE) .......................... 10 2010 005 793
May 25, 2010  (DE) .......................... 10 2010 021 455

(51) Int. Cl.
*H01G 4/06* (2006.01)
*H01G 4/228* (2006.01)
*H01G 4/30* (2006.01)
*H02M 3/06* (2006.01)
*H01G 4/38* (2006.01)
*H01C 7/04* (2006.01)
*H01G 4/12* (2006.01)

(52) U.S. Cl.
CPC .. *H01G 4/38* (2013.01); *H01C 7/04* (2013.01); *H01G 4/1218* (2013.01); *H01G 4/1236* (2013.01); *H01G 4/30* (2013.01)

(58) Field of Classification Search
CPC ........... H01G 4/30; H01G 4/232; H02M 3/07; H02M 3/18
USPC .......... 361/321.1, 306.3, 309, 321.2; 307/309
See application file for complete search history.

(56) References Cited

U.S. PATENT DOCUMENTS

| 4,219,866 A | 8/1980 | Maher |
|---|---|---|
| 4,324,750 A | 4/1982 | Maher |

(Continued)

FOREIGN PATENT DOCUMENTS

| CN | 1636254 A | 7/2005 |
|---|---|---|
| CN | 101529539 A | 9/2009 |

(Continued)

OTHER PUBLICATIONS

Herbert, J.M., "Ceramic Dielectrics and Capacitors," Electrocomponent Science Monographs, vol. 6, 1985, pp. 128-129.

(Continued)

*Primary Examiner* — Eric Thomas
*Assistant Examiner* — Arun Ramaswamy
(74) *Attorney, Agent, or Firm* — Slater Matsil, LLP

(57) ABSTRACT

A ceramic multilayer capacitor includes a first capacitor unit, which comprises a first material, and a second capacitor units, which comprises a second material. The first and the second capacitor unit are electrically connected in parallel. At low applied voltages, the first material has a high dielectric value and, at high applied voltages the second material has a high dielectric value.

21 Claims, 5 Drawing Sheets

(56) References Cited

U.S. PATENT DOCUMENTS

| | | |
|---|---|---|
| 5,448,103 A | 9/1995 | De Wit |
| 6,985,054 B2 | 1/2006 | Gevorgian et al. |
| 7,763,923 B2 | 7/2010 | Yeh et al. |
| 8,101,495 B2 | 1/2012 | Riess et al. |
| 2006/0001068 A1 | 1/2006 | Mosley et al. |
| 2008/0293864 A1 | 11/2008 | Tan et al. |
| 2010/0182730 A1 | 7/2010 | Beelen et al. |

FOREIGN PATENT DOCUMENTS

| | | |
|---|---|---|
| DE | 29 41 304 A1 | 4/1980 |
| JP | 5463353 A | 5/1979 |
| JP | 5596622 A | 7/1980 |
| JP | 55124224 A | 9/1980 |
| JP | 57155715 A | 9/1982 |
| JP | 6052611 U | 4/1985 |
| JP | 3240213 A | 10/1991 |
| JP | 5101964 A | 4/1993 |
| JP | 06251997 A * | 9/1994 |
| WO | WO 2008/050271 A2 | 5/2008 |

OTHER PUBLICATIONS

Kaufman, D. Y., et al., "High-Dielectric-Constant Ferroelectric Thin Film and Bulk Ceramic Capacitors for Power Electronics," Submitted to Proceedings of the Power Systems World (PSW)/Power Conversion and Intelligent Motion (PCIM) '99 Conference, Nov. 6-12, 9 pages, Chicago, Illinois.

* cited by examiner

CERAMIC MULTILAYER CAPACITOR

This patent application is a national phase filing under section 371 of PCT/EP2011/050989, filed Jan. 25, 2011, which claims the priority of German patent application 10 2010 005 793.2, filed Jan. 25, 2010, and German patent application 10 2010 021 455.8, filed May 25, 2010, each of which is incorporated herein by reference in its entirety.

TECHNICAL FIELD

A ceramic multilayer capacitor suitable for high-power applications is specified. The multilayer capacitor can be used, for example, as a filter element in an AC/DC or DC/DC converter.

BACKGROUND

Polymer film capacitors and ceramic capacitors, for example so-called X7R capacitors, are known.

SUMMARY OF THE INVENTION

In one aspect of the invention, a capacitor has a high power density.

In one embodiment, a ceramic multilayer capacitor comprises a first and a second capacitor unit. The capacitor units are electrically connected in parallel. The first capacitor unit comprises a first material and the second capacitor unit comprises a second material. Preferably, the first material differs from the second material.

By way of example, the capacitor is operated in a voltage range of 0 V to 2000 V. Preferably, the capacitor is operated in a voltage range of 0 V to 700 V.

The first material has a high dielectric value at low applied voltages and the second material has a high dielectric value at high applied voltages. The term "low voltages" preferably denotes voltages which are in the lower range of the voltage range used, for example in the lower third of the voltage range used. By way of example, the lower voltage range corresponds to a field strength range of 0 V/$\mu$m to 3 V/$\mu$m. The term "high voltages" preferably denotes voltages which are in the upper range of the voltage range used, for example in the upper third of the voltage range used. The upper voltage range corresponds, for example to a field strength range of 5 V/$\mu$m up to the breakdown field strength of the second material.

The term "high dielectric value" preferably denotes dielectric values above a value of 500, particularly preferably above a value of 1000.

By way of example, the first material has a dielectric value of greater than 500, for example greater than 5000, preferably greater than 10,000, in the lower range of the voltage range used. By way of example, the second material has a dielectric value of greater than 2000, preferably greater than 5000, in the upper range of the voltage range used.

By way of example, the first material has a maximum in the dielectric value at low voltages and the second material has a maximum in the dielectric value at high voltages.

Preferably, the multilayer capacitor has a high effective dielectric value at high and at low voltages on account of the parallel connection of the capacitor units. The effective dielectric value can be calculated from the capacitance of the multilayer capacitor. Hereinafter, the effective dielectric value of the multilayer capacitor is also designated in an abbreviated manner as dielectric value of the multilayer capacitor.

Preferably, such a ceramic multilayer capacitor has a high dielectric value in the entire voltage range used on account of the parallel connection. By way of example, the dielectric value is greater than 500, preferably greater than 5000, at every point of the voltage range.

Each capacitor unit per se can have a high dielectric value for example only in a partial range of the voltage range used. By way of example, in the case of each capacitor unit, the dielectric value as a function of the voltage assumes a maximum in a partial range.

By way of example, the dielectric value of the first capacitor unit assumes a maximum at low voltages and falls greatly as the voltage rises. Correspondingly, preferably the dielectric value of the first material assumes a maximum at low field strengths generated externally and falls greatly as the field strength rises. By way of example, the dielectric value of the second capacitor unit assumes a maximum at high applied voltages and falls greatly as the voltage decreases. Correspondingly, preferably the dielectric value of the second material assumes a maximum at high field strengths and falls greatly at lower field strengths. The second material can be chosen, for example, such that it has a maximum dielectric value for the field strength which corresponds to the maximum operating voltage.

On account of the parallel connection of the capacitor units and the resultant superposition of the individual dielectric values to form a dielectric value of the multilayer capacitor, it is possible, in order to obtain a desired profile of the dielectric value of the entire multilayer capacitor, to use materials for which the dielectric value is greatly dependent on field strength. In particular, consideration is also given to particularly cost-effective materials that are easy to process.

In one embodiment of the capacitor, the voltage dependence of the dielectric value of the multilayer capacitor is less than the voltage dependence of the dielectric values of the individual capacitor units on account of the parallel connection of the capacitor units. This preferably applies to the entire voltage range used, e.g., from 0 V to 700 V.

By way of example, the multilayer capacitor has a significantly flatter profile of the dielectric value than each of the capacitor units. Preferably, the multilayer capacitor has an almost constant profile of the dielectric value against the field strength. In this case, the capacitor has a particularly uniform behavior.

By way of example, the first material is ferroelectric and the second material is anti-ferroelectric. The term "ferroelectric" denotes a material having ferroelectric properties, in particular preferably in the voltage range used. The term "anti-ferroelectric" denotes a material having anti-ferroelectric properties, in particular preferably in the voltage range used.

An anti-ferroelectric material preferably has a low dielectric value at low field strengths. At higher voltages, a peak arises in the dielectric value. A ferroelectric material preferably has a maximum in the dielectric value at low to medium field strengths. The dielectric value of the ferroelectric material preferably decreases as the field strength rises.

By way of example, a ceramic based on barium titanate or lead titanate is used for the first material.

By way of example, a ceramic based on lead zirconate titanate is used for the second material. In a further embodiment, a ceramic based on bismuth-sodium is used for the second material.

In one embodiment, the multilayer capacitor comprises at least one temperature regulator for regulating the temperature of at least one of the capacitor units.

Preferably, by means of the temperature regulator, the temperature of one or both capacitor units is set in such a way that the power capacity, in particular the power density, of the entire capacitor is as high as possible.

This is particularly advantageous if one or both materials have a greatly temperature-dependent profile of the dielectric value. By way of example, the dielectric value has a narrow-band maximum above the temperature of one or both materials. The width of the maximum is between 5 K and 20 K, for example.

Preferably, the temperature regulator in this case sets the temperature of the material to a value at which the material has a dielectric value which is in the vicinity of the maximum of the dielectric value, preferably at the edge of the maximum. In this case, the dielectric value can be kept at a controlled value, with the result that an increased operating reliability of the capacitor is achieved.

In one embodiment, the second material has a maximum dielectric value at that field strength which corresponds to the maximum operating voltage of the multilayer capacitor.

Preferably, the temperature regulator is embodied as a PTC thermistor.

In particular, a PTC ceramic (PTC stands for positive temperature coefficient) can be used for this purpose.

By virtue of the use of a ceramic material, the temperature regulator can be integrated into the ceramic capacitor in a space-saving manner, with the result that a miniaturization and an increase in the power density of the capacitor can be achieved. Preferably, the volume required for the temperature regulator is very small.

By way of example, a ceramic greatly dependent on temperature is used for the first material, a ceramic greatly dependent on field strength is used for the second material, and a PTC ceramic is used for the temperature regulator.

The temperature regulator is preferably self-regulating, such that a desired temperature, the adjustment temperature, is established at a set operating voltage. Preferably, this temperature is kept constant by the temperature regulator.

In one embodiment, the temperature regulator is provided for setting the temperature of at least one of the materials to a value at which the dielectric value of the material is as high as possible. By way of example, the dielectric value of the material assumes a value in the vicinity of a maximum of the dielectric value at the set temperature.

By way of example, the temperature regulator is provided for setting the temperature of the first material to a value at which the dielectric value of the first material is as high as possible. By way of example, the dielectric value of the material is in the vicinity of a maximum in the voltage range used. By way of example, the set temperature is in the region of the Curie temperature of the first material. In this temperature range, the second material can have, for example, a dielectric value which is in the vicinity of a maximum of the dielectric value. In one embodiment, the maximum in the dielectric value of the second material is exceeded at the set temperate.

In a further embodiment, the temperature regulator is provided for setting the temperature of the second material to a value at which the dielectric value of the second material is as high as possible. By way of example, the dielectric value of the second material assumes a value in the vicinity of a maximum of the dielectric value at the set temperature.

The temperature can also be set so as to result in a maximum in the dielectric value of the entire multilayer capacitor or an optimum of dielectric value and loss angle.

In a further embodiment, a first temperature regulator is used for setting the temperature of the first material and a second temperature regulator is used for setting the temperature of the second material.

In particular, the first and the second temperature regulator can be decoupled from one another, such that the temperature of the first material and of the second material is different. Preferably, the temperatures of the first and of the second material are set such that the dielectric values both of the first and of the second material are as high as possible. By way of example, the dielectric values of both materials are in the vicinity of a respective maximum of the dielectric value at the set temperatures in the voltage range used.

In one embodiment, the multilayer capacitor comprises an overvoltage protection, which is electrically connected in parallel with the capacitor units.

In the case of alternating voltage, charge reversals between the capacitor units occur owing to the parallel connection between the first and the second capacitor unit. The overvoltage protection serves to dissipate voltage spikes. By way of example, the overvoltage protection is embodied as a varistor.

As an alternative or in addition thereto, in one embodiment the multilayer capacitor has an overcurrent protection in order to dissipate current spikes. By way of example, the overcurrent protection is embodied as a PTC element.

As an alternative or in addition to an overcurrent protection or an overvoltage protection, in one embodiment the multilayer capacitor has an inductance, which is electrically connected in series with the first and second capacitor units. In the case of alternating operating voltage, the inductance can serve for the temporal control of the charge reversals between the capacitors.

In further embodiments, the capacitor can comprise more than two capacitor units. By way of example, the capacitor comprises a plurality of first capacitor units, containing the first material, and a plurality of second capacitor units, containing the second material. The capacitor can also comprise further parallel-connected capacitor units comprising further materials that differ from the first and from the second material.

Some possible compositions for first and second materials are specified below. In particular, in the case of the multilayer capacitors specified, on account of the parallel connection of the capacitor units, it is also possible to use materials which cannot be used in otherwise conventional capacitors on account of their great temperature or field strength dependence of the dielectric values.

By way of example, the first material has one of the following compositions:
a) $(1-x) BaTiO_3 + x BaZrO_3$ where $0 < x < 0.25$,
b) $Ba_{1-x}Sr_xTi_{1-y}Zr_yO_3$ where $0 < x < 1$ and $0 \leq y < 1$,
c) $Pb_{1-x}Sr_xTi_{1-y}Zr_yO_3$ where $0 < x < 1$ and $0 \leq y < 1$,
d) $Ba_{1-x}Ca_xTi_{1-y}Zr_yO_3$ where $0 < x < 1$ and $0 \leq y < 1$.

By way of example, the second material has one of the following compositions:
e) $Pb_{1-1.5y}La_yTi_{1-z}Zr_zO_3$ where $0 < y < 0.15$ and $0.6 < z < 1$,
f) $Pb_{1-1.5y}Nd_yTi_{1-z}Zr_zO_3$ where $0 < y < 0.15$ and $0.6 < z < 1$,
g) $(1-x) PLZT + x PNZT$, where $0 < x < 1$, wherein PLZT denotes a material of the composition e) and PNZT denotes a material of the composition f),
h) $Bi_{0.5}Na_{0.5}TiO_3$,
i) $(1-x) BNT + x BT$ where $0 < x < 0.35$, wherein BNT denotes a material of the composition h) and BT denotes a material of the composition $BaTiO_3$,
k) $(1-x) BNT + x PT$ where $0 < x < 0.35$, wherein BNT denotes a material of the composition h) and PT denotes a material of the composition $PbTiO_3$.

BRIEF DESCRIPTION OF THE DRAWINGS

The component specified are explained below with reference to schematic figures that are not true to scale.

DETAILED DESCRIPTION OF ILLUSTRATIVE EMBODIMENTS

Figure 1:
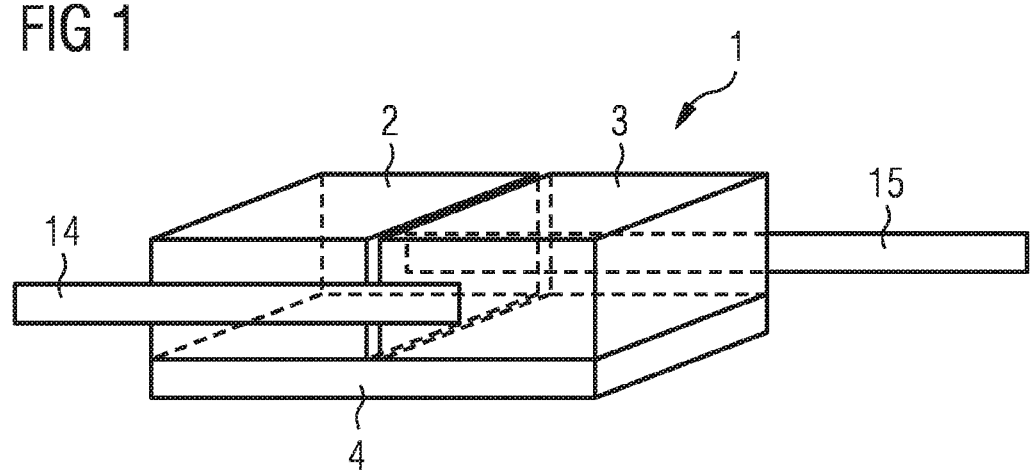
FIG. 1 shows a first exemplary embodiment of the multilayer capacitor in a schematic illustration.

FIG. 1 shows a schematic construction of a ceramic multilayer capacitor 1. The multilayer capacitor 1 comprises a first capacitor unit 2 and a second capacitor unit 3, which are interconnected in parallel by means of electrical connections 14, 15.

The first capacitor unit 2 comprises a first ceramic material, which has a high dielectric value at low applied voltages. The second capacitor unit 3 comprises a second ceramic material, which has a high dielectric value at high applied voltages. On account of the parallel connection of the first 2 and the second 3 capacitor units, a dielectric value that is high both at high and at low voltages arises for the entire multilayer capacitor.

Both capacitor units 2, 3 have a multilayer construction composed of ceramic layers and, situated therebetween, electrode layers (not illustrated here). The material of the ceramic layers in the corresponding multilayer unit 2, 3 is respectively designated as first and second material, respectively. By way of example, the first material is a ferroelectric ceramic based on barium titanate or lead titanate. The second material is, for example, an anti-ferroelectric ceramic based on lead zirconate titanate. As an alternative thereto, lead-free anti-ferroelectrics based on $BiNaTi_2O_6$ or the solid phase solutions thereof comprising $BaTiO_3$ or $PbTiO_3$ are also possible. The ceramics can also comprise sintering additives, such as, e.g., boron or Li glasses. The electrode layers comprise, for example, one or a plurality of the metals Ni, Cu, Ag, AgPd or Pd. In particular, it is also possible to use base metals.

The first capacitor unit 2 and the second capacitor unit 3 are thermally conductively connected to a temperature regulator 4, which is embodied as a self-regulating PTC element. By means of the temperature regulator, the temperature of the capacitor units 2, 3 is set such that the power capacity of the entire multilayer capacitor 1 is as high as possible. By way of example, the temperature is set such that the ferroelectric material has a value in the vicinity of a maximum of the dielectric value at this temperature. This is advantageous particularly in the case of a greatly temperature-dependent profile of the dielectric value of the material. In the case of a ferroelectric material having the composition $Ba(Ti,Zr)O_3$, by way of example, the temperature is set to 80° C.

Instead of a single temperature regulator 4, it is also possible to use a first temperature regulator and a second temperature regulator, which are decoupled from one another. The first temperature regulator can be provided for setting the temperature of the first material and the second temperature regulator can be provided for setting the temperature of the second material to values at which the dielectric values of the materials are as high as possible.

The first capacitor unit 2 is mechanically connected to the second capacitor unit 3 by means of the electrical connections 14, 15. The first 2 and the second capacitor unit 3 can also be fixed to a common chassis.

Figure 2A:
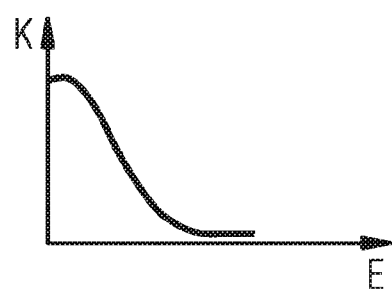
FIG. 2A shows the field strength dependence of the dielectric value of a first material.

FIG. 2A shows the field strength dependence of the dielectric value K as a function of the field strength E for a first material, e.g., a ferroelectric material, which can be used in the first capacitor unit 3 from FIG. 1. At low voltages, the dielectric value is high, preferably significantly above a value of 500, particularly preferably significantly above a value of 1000. At high voltages, the dielectric value decreases greatly.

Figure 2B:
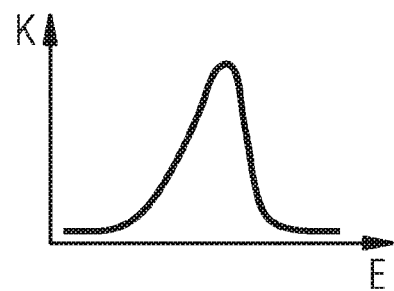
FIG. 2B shows the field strength dependence of the dielectric value of a second material.

FIG. 2B shows the profile of the dielectric value K of a second material as a function of the field strength E. By way of example, the second material is an anti-ferroelectric material that can be used in the second capacitor unit 3 from FIG. 1. At high applied field strengths, the second material has a maximum in the dielectric value. Preferably, the maximum dielectric value is significantly greater than 500 and preferably significantly greater than 1000. At lower field strengths, the dielectric value is significantly lower. The dielectric value of the second material is therefore greatly dependent on field strength.

Figure 2C:
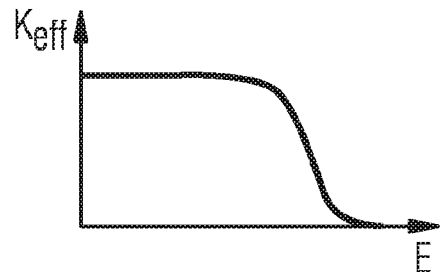
FIG. 2C shows the field strength dependence of the effective dielectric value of a capacitor comprising a first capacitor unit comprising a first material and a second capacitor unit comprising a second material.

FIG. 2C shows the field strength dependence of the effective dielectric value $K_{eff}$ of a multilayer capacitor comprising a capacitor unit comprising the first material from FIG. 2A and a second capacitor unit comprising the second material from FIG. 2B. The dielectric value arises from a superposition of the dielectric values from FIGS. 2A and 2B on account of the parallel connection of the capacitor units 2, 3. The dielectric value of the multilayer capacitor is at a high value, preferably at a value of significantly above 500, particularly preferably at a value of significantly above 1000, in a large voltage range. Moreover, the dielectric value has a flat profile and thus a low field strength dependence over a large voltage range.

Figure 3A:
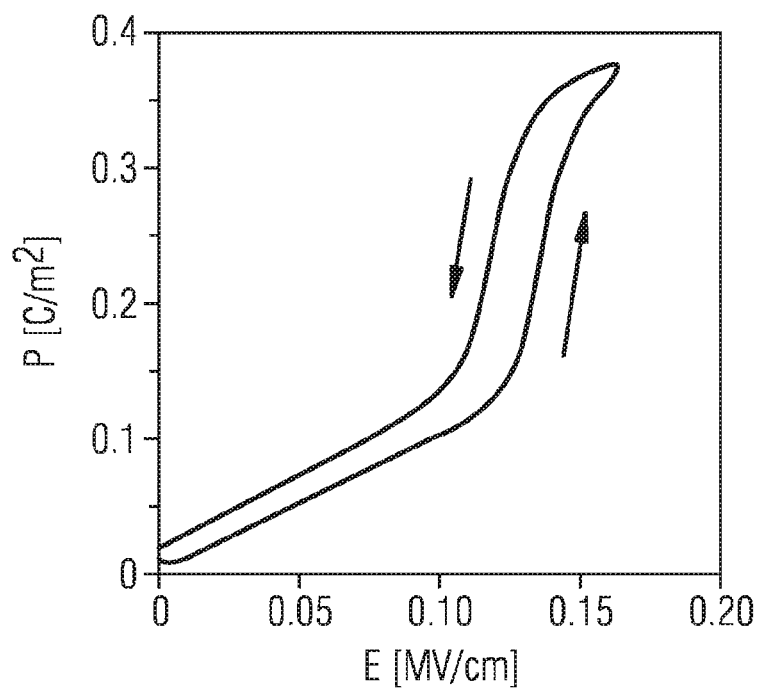
FIG. 3A shows the polarization curve of an anti-ferroelectric material.

FIG. 3A shows the polarization curve of an anti-ferroelectric material that can be used as second material in a multilayer capacitor. The polarization P for a rising field strength E is identified by an arrow upward and for a falling field strength E is identified by an arrow downward. The anti-ferroelectric material is based on $PbZrO_3$, for example.

Figure 3B:
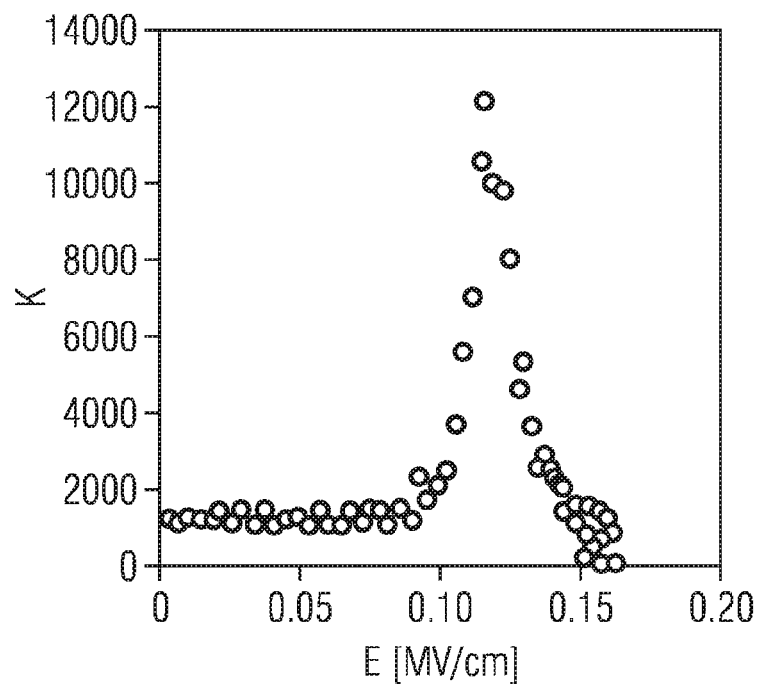
FIG. 3B shows the dielectric value as a function of the electric field of the anti-ferroelectric material from FIG. 3A.

FIG. 3B shows the dielectric values K derived from FIG. 3A as a function of the field strength E. The dielectric values K are 12 000 in a field strength range around 0.12 MV/cm. This corresponds to an operating voltage of between 240 V and 960 V, for example, in the case of a layer thickness of the ceramic layers of 20 μm to 80 μm. Preferably, the entire capacitor has a similarly high dielectric value in a large field strength range. By way of example, the capacitor is operated at a voltage of up to 500 V.

Figure 4:
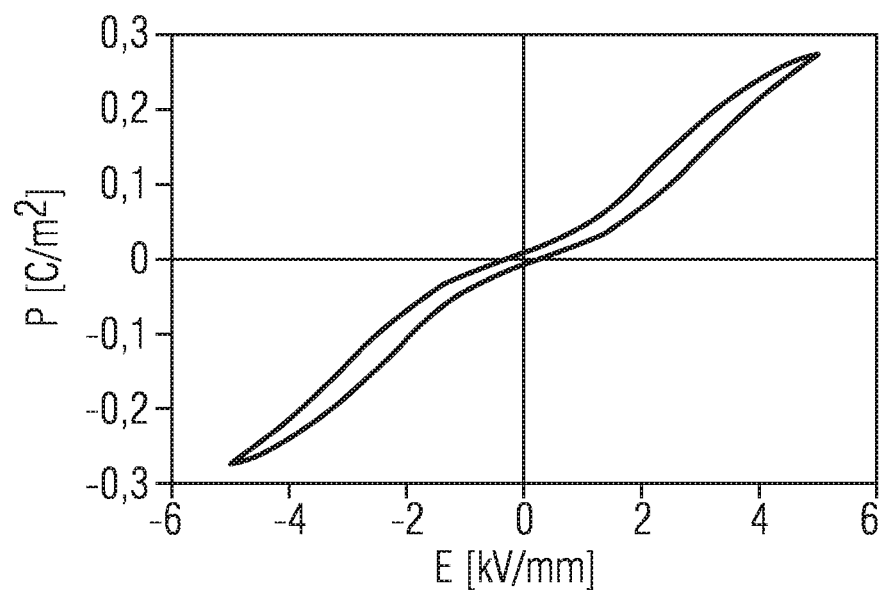
FIG. 4 shows the polarization curve of a further anti-ferroelectric material.

FIG. 4 shows the polarization curve of a further material, based on $BiNaTi_2O_6$, which can be used as second material for a multilayer capacitor. The polarization curve has a flatter profile than the polarization curve of the material from FIG. 3A. In this case, the maximum dielectric value is lower than the maximum dielectric value shown in FIG. 3B and has a lower field strength dependence.

Similar polarization curves arise from isotype substitution, such as $BiMgTi_2O_6$ and in the case of ceramics with Bi deficiency. In order to stabilize the electronegativities, the ceramics can be additionally doped with Nd or La, for example. With solid phase mixtures between such materials comprising $PbTiO_3$, $BaTiO_3$, $PbZrO_3$ or $BaZrO_3$ or combinations thereof, intermediate profiles are also possible.

Figure 5:
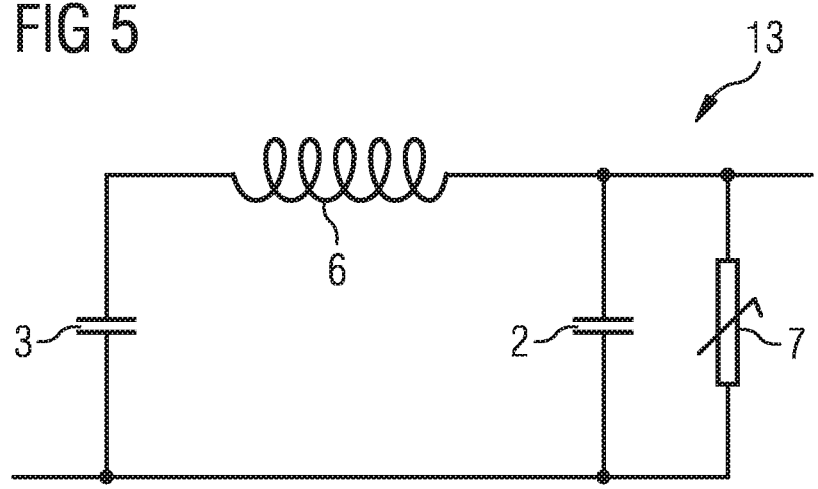
FIG. 5 shows an exemplary embodiment of the electrical interconnection of the capacitor units with an inductance and an overvoltage protection.

FIG. 5 schematically shows a circuit diagram 13 of a multilayer capacitor 1 comprising a first capacitor unit 2 and a second capacitor unit 3, which are electrically interconnected in parallel.

On account of the parallel connection of the capacitor units 2, 3, charge reversals occur in the case of alternating operating voltage. For temporal control, therefore, an inductance 6 is connected in series between the first and the second capacitor units 2, 3. For protection against overvoltages, an overvoltage protection 7 embodied as a varistor is electrically connected in parallel with the capacitor units 2, 3. Instead of a varistor it is also possible to use some other component that is able to rapidly dissipate voltage spikes that occur.

The overvoltage protection 7 and the inductance 6 can, for example, be connected up externally by means of a suitable connection technology or be incorporated together in a module.

Figure 6A:
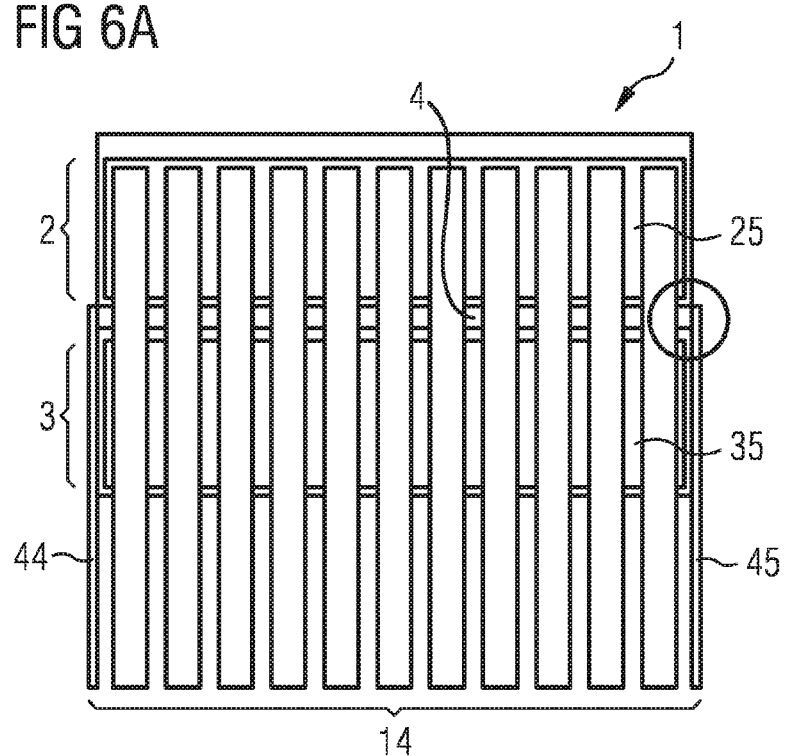
FIG. 6A shows a first exemplary embodiment of a multilayer capacitor in a first side view.

FIG. 6A shows a side view of a first exemplary embodiment of a multilayer capacitor 1. The multilayer capacitor comprises a first capacitor unit 2 and a second capacitor unit 3, which are interconnected in parallel by means of electrical connections, 14, 15. A temperature regulator 4 in the form of a self-regulating PTC heating element is arranged between the first capacitor unit 2 and the second capacitor unit 3.

The multilayer capacitor 1 has a power density of at least 5 $\mu F/cm^3$, preferably of at least 10 $\mu F/cm^3$, for example at an application voltage of 400 V.

Figure 6B:
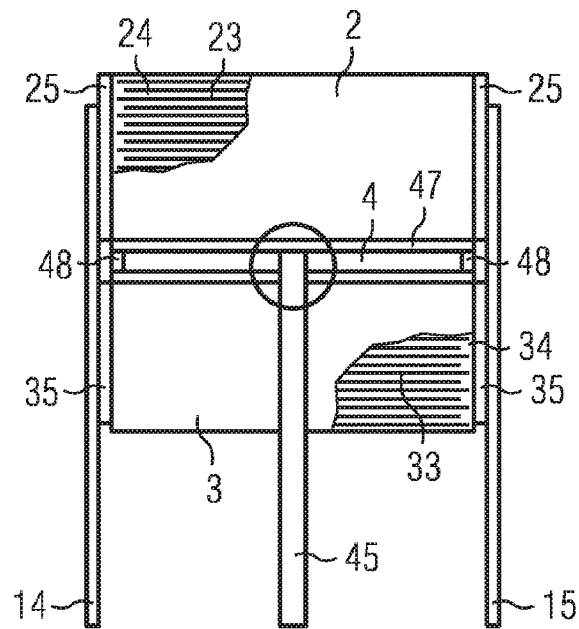
FIG. 6B shows the multilayer capacitor from FIG. 6A in a second side view.

FIG. 6B shows the multilayer capacitor 1 from FIG. 6A rotated by 90° about the vertical axis. The layer construction of the capacitor units 2, 3 is indicated here. Each of the capacitor units 2, 3 has a number of ceramic layers 24, 34 and electrode layers 23, 33 situated therebetween. The ceramic layers 24, 34 respectively comprise the first and the second material. The capacitor units 2, 3 have planar external electrodes 25, 35, by which the electrode layers 23, 33 are electrically connected to the connections 14, 15. By way of example, the connections 14, 15 are fixed to the external electrodes 25, 35 by means of a solder material, a conductive adhesive or by means of wire bonding. The external electrodes 25, 35 can be embodied as firing paste, for example. In further embodiments, the connections can also be directly connected to the electrode layers 23, 33, such that no external electrodes 25, 35 are provided in this case.

The temperature regulator 4 is thermally coupled to the first capacitor unit 2 and the second capacitor unit 3, such that it can set the temperature of both capacitor units 2, 3 to a desired value. The temperature regulator 4 is fixed to the first capacitor unit 2 and the second capacitor unit 3 in each case by means of a thermally conductive adhesive agent 47. The temperature regulator 4 is electrically insulated from the outer sides of the capacitor units 2, 3 by interspaces 48.

Figure 6C:
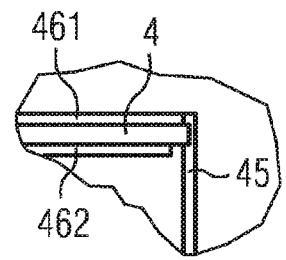
FIG. 6C shows an excerpt from the multilayer capacitor from FIGS. 6A and 6B in a sectional view.

FIG. 6C shows an excerpt from the multilayer capacitor 1, the position of which is indicated by circles in FIGS. 6A and 6B. The excerpt is shown in a lateral plan view corresponding to the plan view in FIG. 6A. Here, the electrical connection 45 of the temperature regulator 4 can be seen. The temperature regulator 4 has two electrode layers 461, 462, wherein one electrode layer 461 is electrically connected to one of the connections 45 and the other electrode layer is electrically connected to the connection 44 situated opposite the former. One of the electrode layers 461 is lead as far as the connection 45, and the other electrode layer 462 is spaced apart from said connection 45 and leads as far as the connection 44.

Figure 7A:
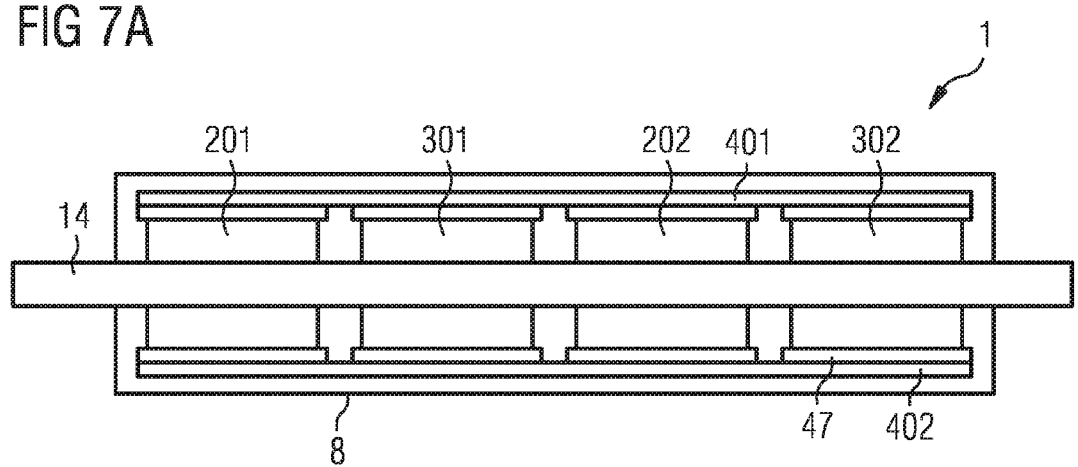
FIG. 7A shows a second exemplary embodiment of a multilayer capacitor in a first side view.

FIG. 7A shows a second exemplary embodiment of a multilayer capacitor 1, wherein a plurality of first capacitor units 201, 202 and a plurality of second capacitor units 301, 302 are arranged alongside one another in an alternate sequence. The capacitor units 201, 202, 301, 302 have a common thermal encapsulation 8.

Figure 7B:
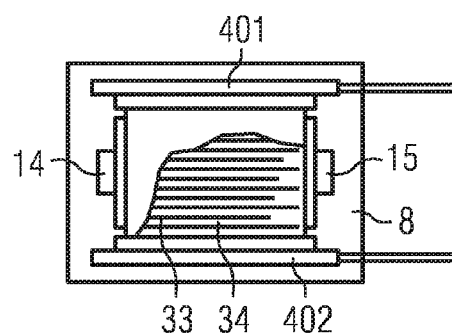
FIG. 7B shows the multilayer capacitor from FIG. 7A in a second side view.

FIG. 7B shows the multilayer capacitor from FIG. 7A in a view rotated by 90° about the vertical axis. Here, as in FIG. 6B, the multilayer construction of each of the capacitor units 201, 202, 301, 302 is indicated.

The multilayer capacitor comprises two temperature regulators 401, 402, wherein one temperature regulator 401 is arranged above the capacitor units 201, 202, 301, 302 and the second temperature regulator 402 is arranged below the capacitor units 201, 202, 301, 302. The temperature regulators 401, 402 have the same adjustment temperature. A particularly reliable setting of the temperature can be achieved in this way.

The invention claimed is:

1. A ceramic multilayer capacitor comprising:
   a first capacitor unit comprising a first material; and
   a second capacitor unit comprising a second material;
   wherein the first material differs from the second material;
   wherein the first and the second capacitor units are electrically connected in parallel;
   wherein the first material has a high dielectric value at low applied voltages and the second material has a high dielectric value at high applied voltages; and
   wherein, in the entire voltage range from the low applied voltages to the high applied voltages, the voltage dependence of the dielectric value of the multilayer capacitor is less than the voltage dependence of the dielectric value of either the first capacitor unit or the second capacitor unit on account of the parallel connection of the capacitor units.

2. The multilayer capacitor according to claim 1, wherein the dielectric value of the multilayer capacitor is greater than 500 in the entire voltage range used.

3. The multilayer capacitor according to claim 1, wherein the first material has ferroelectric properties and the second material has anti-ferroelectric properties.

4. A ceramic multilayer capacitor comprises:
   a first capacitor unit comprising a first material;
   a second capacitor unit comprising a second material; and
   a temperature regulator configured to regulate the temperature of at least one of the first and second capacitor units;
   wherein the first material differs from the second material;
   wherein the first and the second capacitor units are electrically connected in parallel;
   wherein the first material has a high dielectric value at low applied voltages and the second material has a high dielectric value at high applied voltages; and wherein the temperature regulator is configured to set the temperature of at least one of the materials to a value at which the dielectric value of the material is in the vicinity of a maximum in the voltage range used.

5. The multilayer capacitor according to claim 4, wherein the temperature regulator comprises a PTC thermistor.

6. A ceramic multilayer capacitor comprises:
a first capacitor unit comprising a first material;
a second capacitor unit comprising a second material;
a first temperature regulator configured to set the temperature of the first material; and
a second temperature regulator configured to set the temperature of the second material;
wherein the first material differs from the second material;
wherein the first and the second capacitor units are electrically connected in parallel; and
wherein the first material has a high dielectric value at low applied voltages and the second material has a high dielectric value at high applied voltages.

7. The multilayer capacitor according to claim 6, wherein, in the entire voltage range from the low applied voltages to the high applied voltages, the voltage dependence of the dielectric value of the multilayer capacitor is less than the voltage dependence of the dielectric value of either the first capacitor unit or the second capacitor unit on account of the parallel connection of the capacitor units.

8. The multilayer capacitor according to claim 6, wherein the first temperature regulator is configured to set the temperature of the first material to a value at which the dielectric value of the first material is in the vicinity of a maximum in the voltage range used, and wherein the second temperature regulator is configured to set the temperature of the second material to a value at which the dielectric value of the second material is in the vicinity of the maximum in the voltage range used.

9. The multilayer capacitor according to claim 1, wherein the first material comprises a ceramic based on barium titanate.

10. The multilayer capacitor according to claim 1, wherein the second material comprises a ceramic based on lead zirconate titanate.

11. The multilayer capacitor according to claim 1, wherein the first material has one of the following compositions:
a) $(1-x)\,BaTiO_3+x\,BaZrO_3$ where $0<x<0.25$,
b) $Ba_{1-x}Sr_xTi_{1-y}Zr_yO_3$ where $0<x<1$ and $0\leq y<1$,
c) $Pb_{1-x}Sr_xTi_{1-y}Zr_yO_3$ where $0<x<1$ and $0\leq y<1$, or
d) $Ba_{1-x}Ca_xTi_{1-y}Zr_yO_3$ where $0<x<1$ and $0\leq y<1$.

12. The multilayer capacitor according to claim 1, wherein the second material has one of the following compositions:
e) $Pb_{1-1.5y}La_yTi_{1-z}Zr_zO_3$ where $0<y<0.15$ and $0.6<z<1$,
f) $Pb_{1-1.5y}Nd_yTi_{1-z}Zr_zO_3$ where $0<y<0.15$ and $0.6<z<1$,
g) $(1-x)\,PLZT+x\,PNZT$, where $0<x<1$, wherein PLZT denotes a material of the composition e) and PNZT denotes a material of the composition f),
h) $Bi_{0.5}Na_{0.5}TiO_3$,
i) $(1-x)\,BNT+x\,BT$ where $0<x<0.35$, wherein BNT denotes a material of the composition h) and BT denotes a material of the composition $BaTiO_3$,
k) $(1-x)\,BNT+x\,PT$ where $0<x<0.35$, wherein BNT denotes a material of the composition h) and PT denotes a material of the composition $PbTiO_3$.

13. A ceramic multilayer capacitor comprises:
a first capacitor unit comprising a first material;
a second capacitor unit comprising a second material; and
an overvoltage protection electrically connected in parallel with the capacitor units;
wherein the first material differs from the second material;
wherein the first and the second capacitor units are electrically connected in parallel; and
wherein the first material has a high dielectric value at low applied voltages and the second material has a high dielectric value at high applied voltages.

14. The multilayer capacitor according to claim 13, further comprising a temperature regulator configured to regulate the temperature of at least one of the first and second capacitor units, wherein the temperature regulator is configured to set the temperature of at least one of the materials to a value at which the dielectric value of the material is in the vicinity of a maximum in the voltage range used.

15. The multilayer capacitor according to claim 1, further comprising an inductance, connected in series between the first capacitor unit and the second capacitor unit.

16. The multilayer capacitor according to claim 1, wherein the first material comprises a ceramic based on lead titanate.

17. The multilayer capacitor according to claim 1, wherein the second material comprises a ceramic based on bismuth sodium.

18. The multilayer capacitor according to claim 1, further comprising a temperature regulator configured to regulate the temperature of at least one of the first and second capacitor units.

19. The multilayer capacitor according to claim 4,
wherein the first material has one of the following compositions:
a) $(1-x)\,BaTiO_3+x\,BaZrO_3$ where $0<x<0.25$,
b) $Ba_{1-x}Sr_xTi_{1-y}Zr_yO_3$ where $0<x<1$ and $0\leq y<1$,
c) $Pb_{1-x}Sr_xTi_{1-y}Zr_yO_3$ where $0<x<1$ and $0\leq y<1$, or
d) $Ba_{1-x}Ca_xTi_{1-y}Zr_yO_3$ where $0<x<1$ and $0\leq y<1$; and
wherein the second material has one of the following compositions:
e) $Pb_{1-1.5y}La_yTi_{1-z}Zr_zO_3$ where $0<y<0.15$ and $0.6<z<1$,
f) $Pb_{1-1.5y}Nd_yTi_{1-z}Zr_zO_3$ where $0<y<0.15$ and $0.6<z<1$,
g) $(1-x)\,PLZT+x\,PNZT$, where $0<x<1$, wherein PLZT denotes a material of the composition e) and PNZT denotes a material of the composition f),
h) $Bi_{0.5}Na_{0.5}TiO_3$,
i) $(1-x)\,BNT+x\,BT$ where $0<x<0.35$, wherein BNT denotes a material of the composition h) and BT denotes a material of the composition $BaTiO_3$,
j) $(1-x)\,BNT+x\,PT$ where $0<x<0.35$, wherein BNT denotes a material of the composition h) and PT denotes a material of the composition $PbTiO_3$.

20. The multilayer capacitor according to claim 6,
wherein the first material has one of the following compositions:
a) $(1-x)\,BaTiO_3+x\,BaZrO_3$ where $0<x<0.25$,
b) $Ba_{1-x}Sr_xTi_{1-y}Zr_yO_3$ where $0<x<1$ and $0\leq y<1$,
c) $Pb_{1-x}Sr_xTi_{1-y}Zr_yO_3$ where $0<x<1$ and $0\leq y<1$, or
d) $Ba_{1-x}Ca_xTi_{1-y}Zr_yO_3$ where $0<x<1$ and $0\leq y<1$; and
wherein the second material has one of the following compositions:
e) $Pb_{1-1.5y}La_yTi_{1-z}Zr_zO_3$ where $0<y<0.15$ and $0.6<z<1$,
f) $Pb_{1-1.5y}Nd_yTi_{1-z}Zr_zO_3$ where $0<y<0.15$ and $0.6<z<1$,
g) $(1-x)\,PLZT+x\,PNZT$, where $0<x<1$, wherein PLZT denotes a material of the composition e) and PNZT denotes a material of the composition f),
h) $Bi_{0.5}Na_{0.5}TiO_3$,
i) $(1-x)\,BNT+x\,BT$ where $0<x<0.35$, wherein BNT denotes a material of the composition h) and BT denotes a material of the composition $BaTiO_3$, j) $(1-x)$ BNT+x PT where $0<x<0.35$, wherein BNT denotes a material of the composition h) and PT denotes a material of the composition $PbTiO_3$.

21. The multilayer capacitor according to claim 13, wherein the first material has one of the following compositions:
    a) $(1-x)$ $BaTiO_3$+x $BaZrO_3$ where $0<x<0.25$,
    b) $Ba_{1-x}Sr_xTi_{1-y}Zr_yO_3$ where $0<x<1$ and $0\leq y<1$,
    c) $Pb_{1-x}Sr_xTi_{1-y}Zr_yO_3$ where $0<x<1$ and $0\leq y<1$, or
    d) $Ba_{1-x}Ca_xTi_{1-y}Zr_yO_3$ where $0<x<1$ and $0\leq y<1$; and
wherein the second material has one of the following compositions:
    e) $Pb_{1-1.5y}La_yTi_{1-z}Zr_zO_3$ where $0<y<0.15$ and $0.6<z<1$,
    f) $Pb_{1-1.5y}Nd_yTi_{1-z}Zr_zO_3$ where $0<y<0.15$ and $0.6<z<1$,
    g) $(1-x)$ PLZT+x PNZT, where $0<x<1$, wherein PLZT denotes a material of the composition e) and PNZT denotes a material of the composition f),
    h) $Bi_{0.5}Na_{0.5}TiO_3$,
    i) $(1-x)$ BNT+x BT where $0<x<0.35$, wherein BNT denotes a material of the composition h) and BT denotes a material of the composition $BaTiO_3$,
    j) $(1-x)$ BNT+x PT where $0<x<0.35$, wherein BNT denotes a material of the composition h) and PT denotes a material of the composition $PbTiO_3$.

* * * * *